United States Patent [19]

Kervagoret

[11] Patent Number: 5,655,820
[45] Date of Patent: Aug. 12, 1997

[54] SYSTEM FOR REGULATING PRESSURE WITH HYBRID STRUCTURE FOR A MOTOR VEHICLE HYDRAULIC BRAKING CIRCUIT

[75] Inventor: Gilbert Kervagoret, Argenteuil, France

[73] Assignee: AlliedSignal Europe Services Techniques, Drancy, France

[21] Appl. No.: 424,382

[22] PCT Filed: Apr. 12, 1995

[86] PCT No.: PCT/FR95/00469

§ 371 Date: May 4, 1995

§ 102(e) Date: May 4, 1995

[87] PCT Pub. No.: WO95/30565

PCT Pub. Date: Nov. 16, 1995

[30] Foreign Application Priority Data

May 6, 1994 [FR] France ................ 94 05632

[51] Int. Cl.[6] .................. B60T 13/66; B60T 8/32
[52] U.S. Cl. ............... 303/117.1; 303/14; 303/15; 303/119.2; 303/113.4
[58] Field of Search ............. 303/117.1, 119.2, 303/113.4, 119.1, 113.2, 113.3, 3, 155, 116.1, 115.4, 115.5, 162, 125, 116.2, 13, 14, 15, 114.1, 114.2, 113.1, 122.12, 122.13, 122.09; 188/358, 359; 251/129.08, 129.01, 129.05

[56] References Cited

U.S. PATENT DOCUMENTS

| | | | |
|---|---|---|---|
| 3,286,734 | 11/1966 | Hartshorne | 303/117.1 |
| 4,812,777 | 3/1989 | Shirai | 303/14 |
| 4,902,075 | 2/1990 | Uno et al. | 303/14 |
| 4,940,291 | 7/1990 | Sato | 303/117.1 |
| 4,995,677 | 2/1991 | Matsuda et al. | 188/358 |
| 5,013,096 | 5/1991 | Nishii et al. | 188/358 |
| 5,040,852 | 8/1991 | Takata | 303/113.4 |
| 5,042,886 | 8/1991 | Sato | 303/117.1 |
| 5,106,167 | 4/1992 | Matsuda | 303/117.1 |
| 5,186,525 | 2/1993 | Sato et al. | 303/117.1 |
| 5,244,260 | 9/1993 | Kervagoret | 303/117.1 |
| 5,248,190 | 9/1993 | Sato et al. | 303/113.4 |
| 5,462,343 | 10/1995 | Yoshida et al. | 188/358 |

FOREIGN PATENT DOCUMENTS

| | | |
|---|---|---|
| 0391353 | 10/1990 | European Pat. Off. . |
| 0470858 | 2/1992 | European Pat. Off. . |
| 0470859 | 2/1992 | European Pat. Off. . |
| 9309012 | 5/1993 | WIPO . |

*Primary Examiner*—Douglas C. Butler
*Attorney, Agent, or Firm*—Leo H. McCormick, Jr.

[57] ABSTRACT

A system for regulating pressure in a hydraulic circuit comprising at least one generator (110) of fluid under pressure, at least one reservoir (120) of fluid under low pressure and at least one pressure receiver (130, 130a, 130b). The system has least one solenoid valve with an electrical winding (18, 18a, 18b) and a moving magnetic core controlling the position of a distributor slide valve (16, 16a, 16b) which slides in a bore (14, 14a, 14b). Bore (14, 14a, 14b) communicates with a first duct (82) connected to the generator (110) of fluid under pressure, a second duct (12) connected to the pressure receiver (130, 130a, 130b) and a third duct (78) connected to the reservoir (120) of the fluid under low pressure. The system operates in response to a first type of control signal. (S1, S, Sa, Sb) derived from a plurality of inputs corresponding to the operation of a vehicle. A solenoid valve (40) and associated ball (76) respond to an input from a processor (20) to interrupt the feeding of the system by the generator (110) of fluid under pressure and allow fluid to be communicated to a second generator (50) of fluid under pressure in response to a second type of control signal (54) when ever at least one condition in the first type of control signal is not met in the operation of the vehicle.

5 Claims, 1 Drawing Sheet

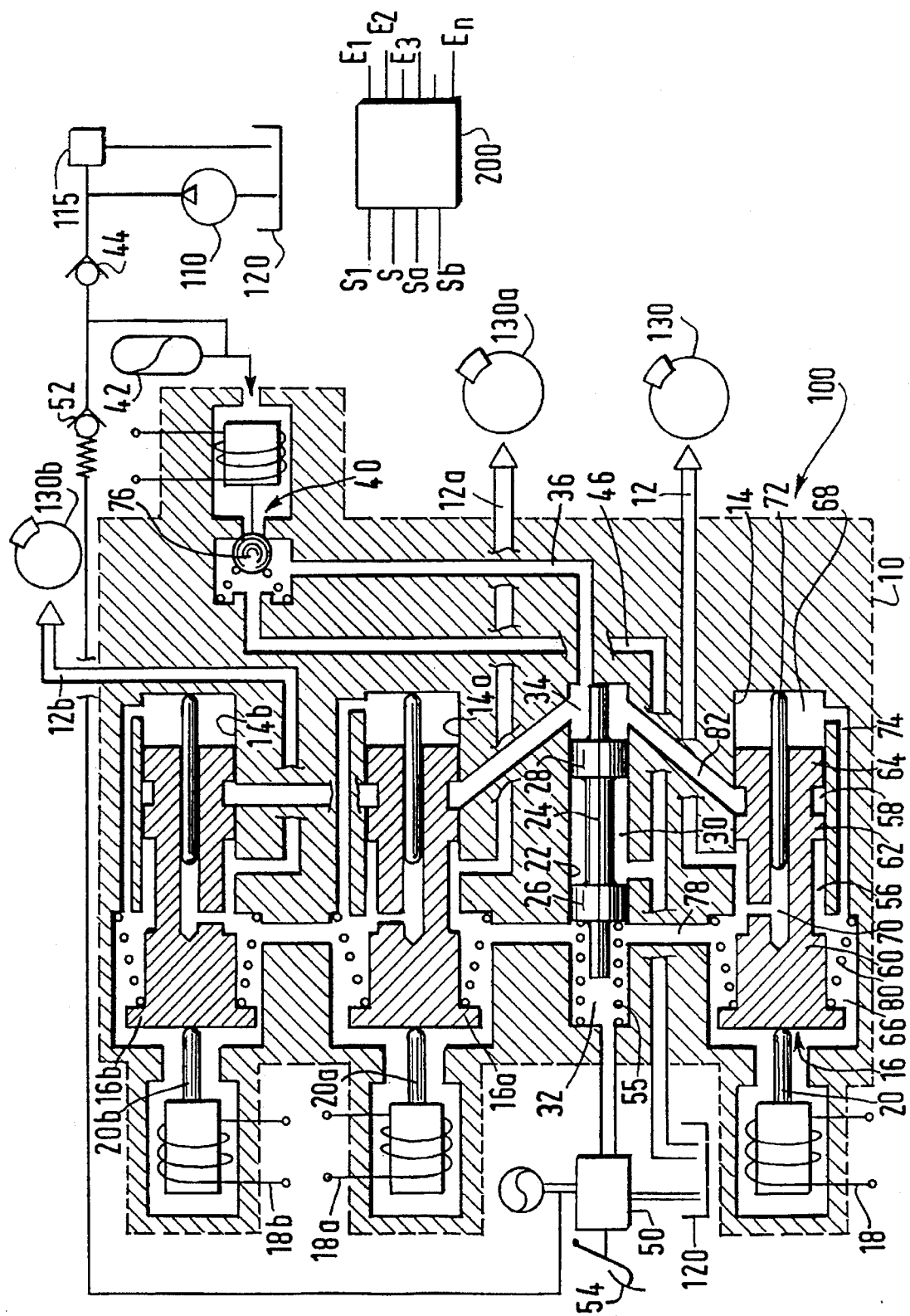

SYSTEM FOR REGULATING PRESSURE WITH HYBRID STRUCTURE FOR A MOTOR VEHICLE HYDRAULIC BRAKING CIRCUIT

The present invention relates to systems for regulating pressure in motor vehicle hydraulic braking circuits. In these circuits, just as in most hydraulic installations, it is necessary to cause the hydraulic pressure to vary in a pressure receiver, in response to a control signal. The pressure receiver may be made up for example, of a hydraulic thrust cylinder or a hydraulic motor, and the control signal may, for example, be mechanical, hydraulic, or electrical.

Document GB-A-2,215,416, for example, corresponding to the preamble of the main claim, discloses a system of this sort in which the pressure receiver is a brake motor and where the control signal is electrical. The system described in this document, however, exhibits numerous drawbacks, such as a very significant electrical power consumption, for example. Above all, it exhibits the major drawback that the slightest failure in the electrical circuit deprives the vehicle equipped with this system of any braking. Such a failure is all the more likely to occur the greater the electrical power consumption.

On the other hand, numerous braking systems are known in which the control signal is mechanical, generally made up of a master cylinder controlled by a brake pedal and possibly associated with a boost servo, which systems may comprise electrically controlled solenoid valves providing an antilock function on the wheels under braking or a function of preventing wheelspin under acceleration. These systems do not, however, allow a purely electrical control of the braking pressure. Such a control is desirable, however, if it is desired for the system also to fulfil a function of automatic braking, for example in conjunction with anticollision radar.

The object of the present invention is consequently to propose a system for regulating pressure in a hydraulic braking circuit, which can switch over from a purely electrical or automatic control mode to a mechanical or manual control mode, and in which a failure of the automatic control circuit still allows operation under the effect of a mechanical or manual control.

The present invention therefore relates to a system for regulating pressure in a hydraulic circuit comprising at least one generator of fluid under pressure, at least one reservoir of fluid under low pressure and at least one pressure receiver, the system comprising at least one solenoid valve including an electrical winding and a moving magnetic core controlling the position of a distributor slide valve sliding in a bore, the bore communicating with a first duct connected to the generator of fluid under pressure, a second duct connected to the pressure receiver and a third duct connected to the reservoir of fluid under low pressure, the system operating in response to a first type of control signal.

According to the invention, the system for regulating pressure includes means for interrupting the feeding of the system by the generator of fluid under pressure and allowing it to be fed by a second generator of fluid under pressure operating in response to a second type of control signal if at least one condition allowing operation in response to the first type of control is not fulfilled.

The invention will be better understood and other objects, characteristics and advantages will emerge from the description of one embodiment which will be given with reference to the appended drawing in which:

The single FIGURE diagrammatically represents, in section, one embodiment of a system for regulating pressure in accordance with the present invention.

The FIGURE represents a system for regulating pressure, including a regulation module denoted overall by the reference 100, located in a hydraulic circuit between a source 110 of fluid under high pressure equipped with a pressure relief valve or safety valve 115, a reservoir 120 of fluid under low pressure, and at least one pressure receiver 130, 130a, 130b.

The regulating module 100 is formed within a body 10, and each pressure receiver 130, 130a, 130b is connected by a duct 12, 12a, 12b to a bore 14, 14a, 14b formed within the body 10. In each bore 14, 14a, 14b there can slide a distributor slide valve 16, 16a, 16b under the control of a solenoid winding valve 18, 18a, 18b of the proportional type, interacting with a moving magnetic core secured to a push rod 20, 20a, 20b.

It is known that the winding of solenoid valves of this type exhibits the essential characteristic of being capable of supplying a substantially constant effort for a given current over a not insignificant range of displacement of the magnetic core. This characteristic is put to use in the present invention in order to provide the required function of pressure regulation by means of a modulation of the current flowing in the winding 18, 18a, 18b.

The body 10 also includes a bore 22 in which there slides a distributor slide valve 24 with two bearing surfaces 26 and 28, delimiting within the bore 22 a central chamber 30 and two end chambers 32 and 34.

The end chamber 34 is connected by a duct 36 to one of the ports of a three-port two-position solenoid valve 40 which is, on the other hand, connected to the source 110 of fluid under high pressure by means of a pressure accumulator 42 and of a non-return valve 44, and to the reservoir 120 of fluid under low pressure by a duct 46.

The end chamber 32 is connected to a metering distributor 50, modulating the hydraulic pressure provided by the source 110 of fluid under high pressure through a calibrated valve 52, as a function of the effort exerted by the driver of the vehicle on a brake pedal 54. A compression spring 55 is furthermore located in the chamber 32 in order to urge the slide valve 24 into a position of rest.

Since the structure and operation of the slide valves 16, 16a, 16b are identical, they will be described hereafter solely with reference to the slide valve 16, and can easily be deduced for the other slide valves by adding the index a or b.

The slide valve 16 is designed to open or close a communication between the pressure receiver 130, the chamber 32 and the chamber 34 of the distributor 24. In order to fulfil this function, the slide valve 16 slides in the bore 14 and includes two grooves 56 and 58 delimited by three bearing surfaces 60, 62 and 64, the end faces of the slide valve 16 being situated in chambers 66 and 68 on either side of the slide valve 16.

The slide valve 16 also includes a blind axial bore 70 in permanent communication with the groove 56, closed in leaktight fashion by a needle 72 bearing on the body 10. The bore 70 forms a reaction chamber creating a reaction force opposing the force acting on the push rods 20, as will be seen later.

The volumes 66 and 68 permanently communicate with each other by virtue of a duct 74. Depending on the position of the slide valve 16, the bearing surface 62 allows or interrupts the communication between the duct 12 and the chamber 34, just like the bearing surface 60 allows or interrupts the communication between the duct 12 and the chamber 66. In its position of rest, the distributor slide valve 24 allows the communication between the chambers 32 and 66.

The operation of the system for regulating braking pressure which has just been described will now be explained. At rest, all the elements occupy the position represented in the FIGURE.

The vehicle equipped with this system for regulating braking is moreover equipped with a processor 200 which receives, as input signals, the signals $E_1, E_2, E_3, \ldots, E_n$ emitted by various sensors (not represented) installed on the vehicle, and delivering output signals $S_1$ in order to control the energization of the solenoid valve 40, as well as signals $S, S_a, S_b$ in order to control the intensity of the current in the windings 18, 18a, 18b respectively. The sensors delivering the signals $E_1, \ldots, E_n$ measure, for example, inter alia, the speed of the vehicle and the rotational speed of the wheels of the vehicle. The input signals $E_1, \ldots, E_n$ of the processor 200 may equally well originate from anticollision radar or any other source.

First of all it will be assumed that all the sensors installed on the vehicle equipped with this system for regulating braking pressure, and of which the signals $E_1, \ldots, E_n$ represent one of the braking parameters, are fully operational. All the conditions are then brought together so that braking can take place under the effect of an electrical control signal.

The processor 200 then, by means of its output $S_1$ commands the energization of the solenoid valve 40. The latter then goes to occupy one of its positions in which it closes off the duct 46, for example by means of a ball 76, and in which it allows communication between the source 110, and the pressure accumulator 42, with the duct 36.

The fluid under high pressure coming from the source 110 is therefore communicated to the chamber 34 in the bore 22, which has the effect of pushing the distributor slide valve 24 back against the action of the spring 55, into a position in which the bearing surface 26 is displaced and interrupts the communication between the chamber 66 and the chamber 32, and in which it allows the communication between the chamber 66 and the chamber 30, itself in permanent communication with the reservoir 120 of fluid under low pressure via the duct 46.

The pressure receiver 130 then finds itself connected to the reservoir 120 of fluid under low pressure by means of the duct 12, the groove 56 of the slide valve 16, the chambers 66 and 30 communicating with each other via a duct 78, and the duct 46.

The fluid under high pressure coming from the source 110 also, by means of the duct 36 and of the chamber 34, reaches the groove 58 in the slide valve 16, which is then in the position of rest represented. As a function of the information which it receives from the various sensors, the processor 200 then, by means of its output S, controls the intensity of the current in the winding 18 in order to urge the slide valve 16, by means of the push rod 20, against a return spring 80.

Since the chambers 66 and 68 communicate with each other via the duct 74 and are connected to the reservoir 120 of fluid under low pressure, the force generated by the current flowing in the winding 18 must oppose only that of the spring 80, the electrical power consumption of the solenoid valve thus being reduced.

The current increasing in the winding 18 leads to the displacement of the slide valve 16 against the action of this spring 80. This displacement leads to the movement of the bearing surface 60 in the bore 14 in order to interrupt the communication between the groove 56 and the chamber 66. The pressure receiver 130 then finds itself isolated from the reservoir 120.

The intensity of the current flowing in the winding 18, and the position of the slide valve 16 then lie within the ranges of values for which there is a proportional relationship between the effort exerted on the slide valve 16 and the control current.

The processor 200 can then modulate the current within this range of values. If the intensity of the current increases, the slide valve 16 is urged a little more against the action of the spring 80, so that the groove 56 of the slide valve 16 is both in communication with the duct 12 for feeding the pressure receiver 130 and with the chamber 34 via a duct 82. The fluid under high pressure coming from the source 110 is therefore communicated to the pressure receiver 130, in which the pressure increases.

If the intensity of the current decreases, the force exerted by the push rod 20 on the slide-valve 16 decreases and the slide valve 16 is urged in the other direction by the spring 80, so that the groove 56 of the slide valve 16 is in communication both with the duct 12 for feeding the pressure receiver 130 and with the chamber 66, itself in communication with the reservoir 120. The pressure in the pressure receiver 130 can therefore decrease.

It is therefore seen that, assuming the operation of all the sensors the functionality of which is necessary for braking has been validated by the processor 200, braking of the vehicle can be provided under the effect of the electrical control from the processor 200 alone, the latter modulating, for example by chopping, the intensity of the current in the winding 18 in order consequently to modulate the pressure in the receiver 130.

It is equally well seen that, during this modulation phase, the pressure prevailing in the reaction chamber 70 is permanently equal to the pressure prevailing in the pressure receiver 130, and creates, on the slide valve 16, a force opposing the displacement of the slide valve and which is a direct function of the pressure prevailing in the pressure receiver, which allows this pressure to be driven precisely by means of the intensity of the current in the winding 18.

The braking thus obtained by electrical control may exhibit all the desired characteristics stored in memory in the processor 200, in order to fulfil, for example, the antilock function on the wheels, the function of preventing wheelspin under acceleration, that of holding the vehicle on a slope, and that of maintaining a constant speed or constant distance from the vehicle in front, these examples not being limiting.

Braking may equally well be obtained by a mechanical or manual control. The solenoid valve 40 is then at rest, and prevents the communication between the source 110 of fluid under high pressure and the duct 36. The chamber 34 in the bore 22 is then connected to the reservoir 120 under low pressure by the ducts 36 and 46, and the distributor slide valve 24 occupies the position represented.

When the driver of the vehicle presses on the pedal 54, the metering distributor 50, supplied with fluid under pressure by the source 110 through the valves 44 and 52, modulates the pressure in the chamber 32 as a function of the effort exerted by the driver on the pedal 54.

The pressure in the chamber 32 is communicated to the chamber 66 via the duct 78, to the groove 56 of the slide valve 16, to the duct 12 and thus to the pressure receiver 130. The driver of the vehicle may thus directly modulate the pressure in the receiver 130, and consequently the braking of the vehicle, in a way which is entirely conventional.

If, during such braking, the processor 200 detects imminent locking of a wheel, for example the one which is associated with the pressure receiver 130, it then demands the increase in current in the winding 18.

This increase in the current is manifested by a displacement of the slide valve 16 against the spring 80, until the bearing surface 60 comes to interrupt the communication between the chamber 66 and the groove 56. At this instant, the supply of fluid under pressure to the receiver 130 by the metering distributor 50 is interrupted.

The current continuing to increase in the winding 18 leads to an additional displacement of the slide valve 16, bringing the bearing surface 62 beyond the opening of the duct 82 in the bore 14, thus placing the groove 56, and therefore the receiver 130, in communication with the reservoir 120 under low pressure by means of the duct 82, the chamber 34 and the ducts 36 and 46.

The pressure in the receiver 130 can therefore decrease, until the processor 200 detects too high a rotational speed of the wheel associated with the receiver 130. It then demands a decrease in the current in the winding 18, which results in a movement of the slide valve 16 in the opposite direction under the action of the spring 80.

The displacement of the bearing surfaces 62 and 60 has the effect of interrupting the communication established beforehand between the receiver 130 and the reservoir 120 under low pressure, and of re-establishing the communication between the receiver 130 and the metering distributor 50 by means of the chamber 32, the duct 78, the groove 56 and the duct 12. The pressure in the receiver 130 may then increase again.

As in the case of electrically controlled braking, the pressure prevailing in the reaction chamber 70 is permanently equal to the pressure prevailing in the receiver 130, so that the processor 200 can very precisely drive the pressure in the receiver 130 for manually controlled operation, with an antilock phase.

It can therefore clearly be seen that a system for regulating braking pressure has been produced, allowing an automatic operation mode with purely electrical control, making it possible, for example, to prevent wheelspin under acceleration, and an operating mode with manual control, making it possible to provide conventional braking of the vehicle, possibly accompanied with an antilock function on the wheels.

What is more, during automatic operation, with the solenoid valve 40 energized, the distributor slide valve 24 is displaced by the pressure prevailing in the chamber 34 coming from the source 110 of fluid under high pressure. The valve 52, interposed between the source 110 and the metering distributor 50 is calibrated, for example to 30 bar, so that the maximum pressure which can be delivered by the metering distributor 50 in the chamber 32 is less than the pressure prevailing in the chamber 34, equal to the pressure supplied by the source 110.

Thus, during operation in automatic braking, an action from the driver on the pedal 54 will result in all cases in a pressure in the chamber 32 less than the pressure in the chamber 34, and therefore incapable of acting on the distributor slide valve 24. The calibrated valve 52 therefore gives priority to automatic braking by preventing any intervention of the driver which could disturb the electrically controlled operation.

What is more, if the processor 200 detects a failure of at least one of the sensors with which the vehicle is equipped, it then prevents any energizing of the solenoid valve 40, or if the processor 200 is itself defective, the solenoid valve 40 resumes its position of rest represented, of its own accord. The distributor slide valve 24 occupies the position represented in the FIGURE in which mechanically or manually controlled braking is possible, possibly with operation in antilock mode if the processor 200 is operational and if all the sensors specific to such an operation are also operational.

Of course, the invention is not limited to the embodiment which has just been described, and the person skilled in the art could make numerous modifications thereto without departing from the scope of the invention as defined by the appended claims. Thus, three pressure receivers have been represented, two of which could be used, for example, to brake each of the front wheels of a vehicle independently of one another and the third could be used to brake the rear wheels of the vehicle simultaneously. It is quite obvious that just two proportional solenoid valves could be used if a front-rear braking split is deemed sufficient, or four or more of these could be used if it is desired to brake the four wheels of the vehicle separately, or if this vehicle has more than two axles. Likewise, a conventional master cylinder, associated with a pneumatic booster servo could be used instead of the metering distributor, making sure that the maximum pressure that it can provide is less than the pressure delivered by the source of fluid under high pressure.

I claim:

1. A system for regulating pressure in a hydraulic circuit comprising a first generator of fluid under pressure, at least one reservoir of fluid under low pressure and at least one pressure receiver, said system comprising at least one solenoid valve including an electrical winding and a moving magnetic core for controlling the position of a first distributor proportional slide valve sliding in a bore of a housing, said bore communicating with a first duct connected to said first generator of fluid under pressure, said bore communicating with a second duct connected to said pressure receiver, said bore communicating with a third duct connected to said reservoir of fluid under low pressure when said system operates in response to a first type of control signal, said winding of said solenoid valve controlling the position of said first distributor proportional slide valve characterized in that said system for regulating pressure includes a two-position solenoid valve connected to said first generator of fluid under pressure and to said reservoir of fluid under low pressure for interrupting the feeding of the system by said first generator of fluid under pressure and allowing said first generator to be fed by a second generator of fluid under pressure operating in response to a second type of control signal if at least one condition allowing operation in response to the first type of control is not fulfilled, a second distributor proportional slide valve delimiting within a second bore of said housing to define a first end chamber and a second end chamber, said first end chamber being connected to said two-position solenoid valve and said second end chamber being connected to said second generator of fluid under pressure, said two-position solenoid valve connecting, in a first position, said first end chamber to said first generator of fluid under pressure for operation in response to said first type of control signal, and, in a second position, said first end chamber to said reservoir of fluid under low pressure for operation in response to said second type of control signal.

2. The system for regulating pressure according to claim 1, characterized in that said first type of control signal is electrical, and in that said second type of control signal is mechanical or manual.

3. The system for regulating pressure according to claim 1, characterized in that said first and second end chambers are connected to said first and third ducts.

4. The system for regulating pressure according to claim 1, characterized in that said second generator of fluid under pressure is a metering distributor connected to said second end chamber and modulating the pressure as a function of the effort exerted on a brake pedal.

5. The system for regulating pressure according to claim 4, characterized in that said metering distributor is connected to said first generator of fluid under pressure by means of a calibrated valve.

* * * * *